(12) United States Patent
Dubbeldeman et al.

(10) Patent No.: US 10,078,097 B2
(45) Date of Patent: Sep. 18, 2018

(54) VIBRATION OR ACCELERATION SENSOR APPLYING SQUEEZE FILM DAMPING

(71) Applicant: Sonion Nederland B.V., Hoofddorp (NL)

(72) Inventors: Eddy Dubbeldeman, Hoofddorp (NL); Raymond Mögelin, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 0 days.

(21) Appl. No.: 15/611,411

(22) Filed: Jun. 1, 2017

(65) Prior Publication Data

US 2017/0350916 A1   Dec. 7, 2017

(30) Foreign Application Priority Data

Jun. 1, 2016  (EP) ..................................... 16172456

(51) Int. Cl.
  *G01H 1/00*   (2006.01)
  *G01P 15/08*  (2006.01)
  *G01H 3/06*   (2006.01)

(52) U.S. Cl.
  CPC ........... *G01P 15/0802* (2013.01); *G01H 3/06* (2013.01); *G01P 2015/0882* (2013.01)

(58) Field of Classification Search
  CPC ........ G01L 15/0802; G01H 3/06; G01H 3/00; G01H 1/00; G01P 2015/0882
  USPC .................................... 73/654, 652, 649, 570
  See application file for complete search history.

(56) References Cited

U.S. PATENT DOCUMENTS

| | | | | |
|---|---|---|---|---|
| 3,483,951 A | * | 12/1969 | Bonesho | ................. F16F 15/02 188/379 |
| 5,885,471 A | | 3/1999 | Ruben | |
| 5,965,249 A | * | 10/1999 | Sutton | ........................ C08J 9/40 248/562 |
| 6,788,796 B1 | | 9/2004 | Miles et al. | |
| 6,831,577 B1 | | 12/2004 | Furst | |
| 6,853,290 B2 | | 2/2005 | Jorgensen et al. | |
| 6,859,542 B2 | | 2/2005 | Johannsen et al. | |
| 6,888,408 B2 | | 5/2005 | Furst et al. | |

(Continued)

FOREIGN PATENT DOCUMENTS

| | | |
|---|---|---|
| DE | 102013222966 A1 | 5/2015 |
| JP | 2000314442 | 11/2000 |

OTHER PUBLICATIONS

European Search Report corresponding to European Patent Application No. 16172456.2, European Patent Office, dated Dec. 1, 2016; (3 pages).

(Continued)

*Primary Examiner* — Manish S Shah
*Assistant Examiner* — Nigel Plumb
(74) *Attorney, Agent, or Firm* — Nixon Peabody LLP

(57) ABSTRACT

A vibration sensor having a moveable mass being suspended in a suspension member and being adapted to move in response to vibrations or accelerations. The moveable mass and the suspension member are rigidly connected across one or more gaps formed by respective opposing surfaces of the moveable mass and the suspension member. The vibration sensor includes a damping arrangement having a damping substance. The moveable mass is arranged to interact directly or indirectly with the damping substance in order to reduce a mechanical resonance peak of the vibration sensor.

25 Claims, 9 Drawing Sheets

(56) References Cited

U.S. PATENT DOCUMENTS

| | | |
|---|---|---|
| 6,914,992 B1 | 7/2005 | van Halteren et al. |
| 6,919,519 B2 | 7/2005 | Ravnkilde et al. |
| 6,930,259 B1 | 8/2005 | Jorgensen et al. |
| 6,943,308 B2 | 9/2005 | Ravnkilde et al. |
| 6,974,921 B2 | 12/2005 | Jorgensen et al. |
| 7,008,271 B2 | 3/2006 | Jorgensen |
| 7,012,200 B2 | 3/2006 | Moller |
| 7,062,058 B2 | 6/2006 | Steeman et al. |
| 7,062,063 B2 | 6/2006 | Hansen et al. |
| 7,072,482 B2 | 7/2006 | Van Doorn et al. |
| 7,088,839 B2 | 8/2006 | Geschiere et al. |
| 7,110,560 B2 | 9/2006 | Stenberg |
| 7,136,496 B2 | 11/2006 | van Halteren et al. |
| 7,142,682 B2 | 11/2006 | Mullenborn et al. |
| 7,181,035 B2 | 2/2007 | van Halteren et al. |
| 7,190,803 B2 | 3/2007 | van Halteren |
| 7,190,854 B1 | 3/2007 | Novotny |
| 7,206,428 B2 | 4/2007 | Geschiere et al. |
| 7,221,767 B2 | 5/2007 | Mullenborn et al. |
| 7,221,769 B1 | 5/2007 | Jorgensen |
| 7,227,968 B2 | 6/2007 | van Halteren et al. |
| 7,239,714 B2 | 7/2007 | de Blok et al. |
| 7,245,734 B2 | 7/2007 | Niederdraenk |
| 7,254,248 B2 | 8/2007 | Johannsen et al. |
| 7,286,680 B2 | 10/2007 | Steeman et al. |
| 7,292,700 B1 | 11/2007 | Engbert et al. |
| 7,292,876 B2 | 11/2007 | Bosh et al. |
| 7,336,794 B2 | 2/2008 | Furst et al. |
| 7,376,240 B2 | 5/2008 | Hansen et al. |
| 7,403,630 B2 | 7/2008 | Jorgensen et al. |
| 7,415,121 B2 | 8/2008 | Mögelin et al. |
| 7,425,196 B2 | 9/2008 | Jorgensen et al. |
| 7,460,681 B2 | 12/2008 | Geschiere et al. |
| 7,466,835 B2 | 12/2008 | Stenberg et al. |
| 7,492,919 B2 | 2/2009 | Engbert et al. |
| 7,548,626 B2 | 6/2009 | Stenberg et al. |
| 7,657,048 B2 | 2/2010 | van Halteren et al. |
| 7,684,575 B2 | 3/2010 | van Halteren et al. |
| 7,706,561 B2 | 4/2010 | Wilmink et al. |
| 7,715,583 B2 | 5/2010 | Van Halteren et al. |
| 7,728,237 B2 | 6/2010 | Pedersen et al. |
| 7,809,151 B2 | 10/2010 | Van Halteren et al. |
| 7,822,218 B2 | 10/2010 | Van Halteren |
| 7,899,203 B2 | 3/2011 | Van Halteren et al. |
| 7,912,240 B2 | 3/2011 | Madaffari et al. |
| 7,946,890 B1 | 5/2011 | Bondo et al. |
| 7,953,241 B2 | 5/2011 | Jorgensen et al. |
| 7,961,899 B2 | 6/2011 | Van Halteren et al. |
| 7,970,161 B2 | 6/2011 | van Halteren |
| 8,098,854 B2 | 1/2012 | van Halteren et al. |
| 8,101,876 B2 | 1/2012 | Andreasen et al. |
| 8,103,039 B2 | 1/2012 | van Halteren et al. |
| 8,160,290 B2 | 4/2012 | Jorgensen et al. |
| 8,170,249 B2 | 5/2012 | Halteren |
| 8,189,804 B2 | 5/2012 | Hruza |
| 8,189,820 B2 | 5/2012 | Wang |
| 8,223,996 B2 | 7/2012 | Beekman et al. |
| 8,233,652 B2 | 7/2012 | Jorgensen et al. |
| 8,259,963 B2 | 9/2012 | Stenberg et al. |
| 8,259,976 B2 | 9/2012 | van Halteren |
| 8,259,977 B2 | 9/2012 | Jorgensen et al. |
| 8,280,082 B2 | 10/2012 | van Halteren et al. |
| 8,284,966 B2 | 10/2012 | Wilk et al. |
| 8,313,336 B2 | 11/2012 | Bondo et al. |
| 8,315,422 B2 | 11/2012 | van Halteren et al. |
| 8,331,595 B2 | 12/2012 | van Halteren |
| 8,369,552 B2 | 2/2013 | Engbert et al. |
| 8,379,899 B2 | 2/2013 | van Halteren et al. |
| 8,509,468 B2 | 8/2013 | van Halteren et al. |
| 8,526,651 B2 | 9/2013 | Lafort et al. |
| 8,526,652 B2 | 9/2013 | Ambrose et al. |
| 2005/0097959 A1 | 5/2005 | Pike |
| 2006/0093167 A1* | 5/2006 | Mogelin ............... H04R 19/04 381/176 |
| 2006/0227984 A1 | 10/2006 | Sinclair |
| 2010/0172521 A1* | 7/2010 | van Halteren .......... H04R 1/04 381/174 |
| 2011/0182453 A1 | 7/2011 | van Hal et al. |
| 2011/0189880 A1 | 8/2011 | Bondo et al. |
| 2011/0299708 A1 | 12/2011 | Bondo et al. |
| 2011/0299712 A1 | 12/2011 | Bondo et al. |
| 2011/0311069 A1 | 12/2011 | Ambrose et al. |
| 2012/0014548 A1 | 1/2012 | van Halteren |
| 2012/0027245 A1 | 2/2012 | van Halteren et al. |
| 2012/0031185 A1* | 2/2012 | Classen ................ G01P 15/125 73/514.14 |
| 2012/0140966 A1 | 6/2012 | Mocking et al. |
| 2012/0155683 A1 | 6/2012 | van Halteren |
| 2012/0155694 A1 | 6/2012 | Reeuwijk et al. |
| 2012/0168271 A1* | 7/2012 | Ryaboy .................... F16F 7/116 188/379 |
| 2012/0255805 A1 | 10/2012 | van Halteren et al. |
| 2013/0028451 A1 | 1/2013 | de Roo |
| 2013/0136284 A1 | 5/2013 | van Hal et al. |
| 2013/0142370 A1 | 6/2013 | Engbert et al. |
| 2013/0163799 A1 | 6/2013 | Van Halteren |
| 2013/0195295 A1 | 8/2013 | van Halteren et al. |
| 2013/0199295 A1 | 8/2013 | Hoefer |
| 2015/0252799 A1* | 9/2015 | Roscher ............... F04B 39/0027 62/6 |
| 2016/0291050 A1 | 10/2016 | Ehrenpfordt et al. |
| 2017/0089942 A1 | 3/2017 | Chen |

OTHER PUBLICATIONS

Partial European Search Report for Application No. EP 16207614, dated Jun. 14, 2017 (3 pages).

Extended European Search Report for Application No. EP 17174014, dated Oct. 16, 2017 (4 pages).

* cited by examiner

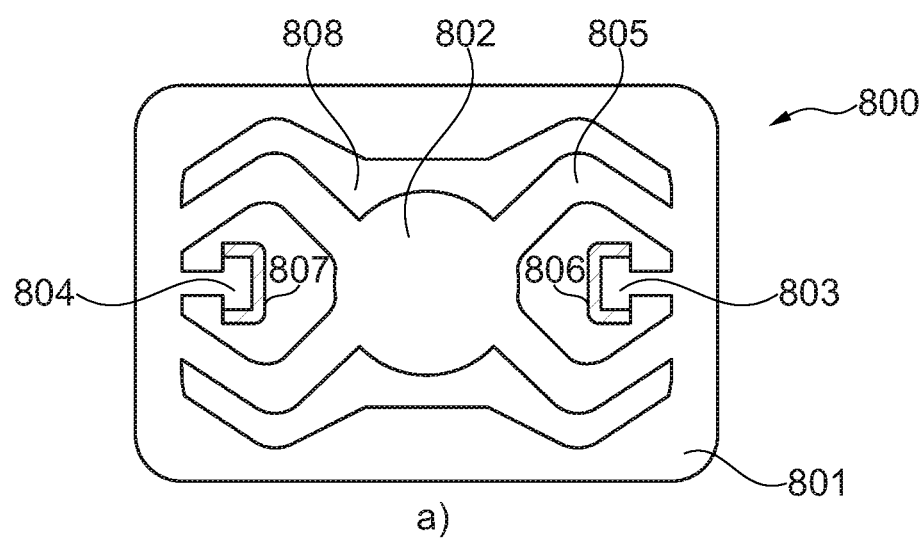
a)
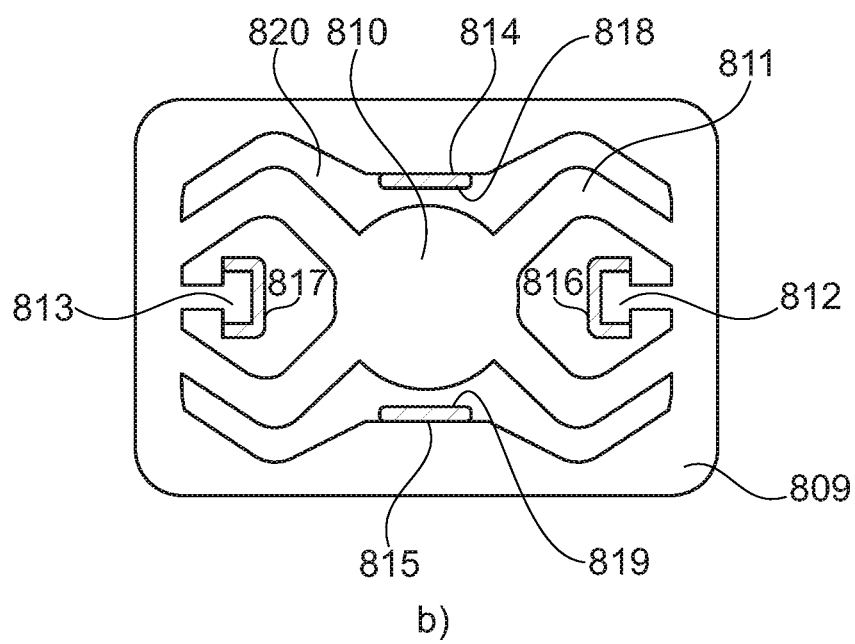
b)
Fig. 8

VIBRATION OR ACCELERATION SENSOR APPLYING SQUEEZE FILM DAMPING

CROSS-REFERENCE TO RELATED APPLICATIONS

This application claims the benefit of and priority to European Patent Application Serial No. 16172456.2, filed Jun. 1, 2016, which is incorporated herein by reference in its entirety.

FIELD OF THE INVENTION

The present invention relates to a vibration or acceleration sensor having a damped resonance peak. In particular, the present invention relates to a vibration or acceleration sensor applying a squeeze film damping arrangement for damping a resonance peak.

BACKGROUND OF THE INVENTION

Damping arrangements relying on squeeze film damping have been applied in various technical areas over the years. For example squeeze film damping has been applied to damp unwanted vibrations in motors.

Within the field of vibration sensors damping of resonance peaks may be needed in order to prevent too high output signal levels at the resonance peak in that such output signal levels may overload the signal processing electronics.

It may be seen as an object of embodiments of the present invention to provide an arrangement for damping a resonance peak of a vibration or acceleration sensor.

It may be seen as a further object of embodiments of the present invention to provide a damping arrangement which does not influence the compliance of the vibration or acceleration sensor in a significant manner.

SUMMARY OF INVENTION

The above-mentioned objects are complied with by providing, in a first aspect, a vibration sensor comprising
1) a moveable mass being suspended in a suspension member and being adapted to move in response to vibrations or accelerations, wherein the moveable mass and the suspension member are rigidly connected across one or more gaps formed by respective opposing surfaces of the moveable mass and the suspension member, and
2) a damping arrangement comprising a damping substance, wherein the moveable mass is arranged to interact directly or indirectly with the damping substance in order to reduce a mechanical resonance peak of the vibration sensor.

Thus, the present invention relates to a sensor for detecting vibrations or acceleration. However, in the following reference will only be made to the detection of vibrations although the general principles underlying the present invention apply equally to the detection of accelerations.

The vibrations may be detected by bringing a moveable mass into movements/vibrations and detecting said movements/vibrations by appropriate detection means, such as appropriate electronic detection means.

The damping arrangement of the present invention is advantageous in that it does not influence the compliance of the vibration sensor in a significant manner. This advantage may be provided by ensuring that the applied damping substance is not limited in volume. Thus, the fact that the damping substance is not limited in volume facilitates that a squeeze film damping mechanism may take place without significantly influencing the compliance of the sensor. In the present context a change of the resonance frequency between 10 Hz and 150 Hz in case of a nominal resonance frequency between 2 kHz and 6 kHz will be acceptable. It should be noted however that the change of the resonance frequency may depend on the viscosity of the damping substance used.

The suspended moveable mass may be arranged to interact directly or indirectly with the damping substance in order to reduce a mechanical resonance peak of the vibration sensor. In the present disclosure direct interaction should be taken to mean that the suspended moveable mass is in direct contact with the damping substance. Indirect interaction should consequently be taken to mean that the suspended moveable mass is not in direct contact with the damping substance.

The damping substance may fill out at least part of the one or more gaps between the moveable mass and the suspension member. In particular, the damping substance may be arranged between an essentially plane surface of the suspended moveable mass and an essentially plane surface of the suspension member. Alternatively or in combination therewith, the damping substance may fill out at least part of one or more gaps formed by respective opposing surfaces of an essential static structure and the suspension member. The essentially static structure may involve a top limiter or any other substantially static frame structure of the sensor. Alternatively or in combination therewith, the damping substance may at least partly be arranged between an essential static structure and the suspended moveable mass.

The damping substance may form a single coherent volume, or it may be divided into a plurality of discrete portions being position at predetermined positions between the suspended moveable mass and for example the suspension member in order to obtain a predetermined damping of the resonance peak. Thus, it may be advantageous to divide the damping substance into a plurality of discrete portions and place these discrete portions at selected spots to get a predetermined damping. The plurality of discrete damping substance portions may involve dots of damping substance, essentially linear damping substance portions and/or curved damping substance portions. Alternatively or in combination therewith, the damping substance may form an enveloping structure, such as a rim-shaped structure, such as an essential circular structure, an essential elliptical structure, an essential rectangular structure and/or an essential quadratic structure. The damping substance may be positioned symmetrically around a static displacement node and/or a static displacement axis of the moveable mass.

In a second aspect the present invention relates to a vibration sensor comprising
1) a moveable mass being suspended in a suspension member and being adapted to move in response to vibrations or accelerations, wherein the moveable mass and the suspension member are rigidly connected, and
2) a damping arrangement comprising
   A. a damping substance being provided as a plurality of discrete damping substance portions, and/or
   B. a damping substance being provided as an enveloping structure of damping substance
wherein the moveable mass is arranged to interact with damping substance in order to reduce a mechanical resonance peak of the vibration sensor.

In the second aspect the damping substance may fill out at least part of one or more gaps formed by respective opposing surfaces of the moveable mass and an essential static structure. The essentially static structure may involve a top limiter or any other substantially static frame structure of the sensor. Alternatively or in combination therewith the damping substance may fill out at least part of one or more gaps formed by respective opposing surfaces of the moveable mass and the suspension member. Alternatively or in combination therewith the damping substance may fill out at least part of one or more gaps formed by respective opposing surfaces of an essential static structure and the suspension member.

The plurality of discrete damping substance portions may form dots of damping substance, essentially linear damping substance portions and/or curved damping substance portions. The enveloping structure of the damping substance may forms a rim-shaped structure, such as an essential circular structure, an essential elliptical structure, an essential rectangular structure and/or an essential quadratic structure. The damping substance may be positioned symmetrically around a static displacement node and/or a static displacement axis of the moveable mass.

The damping arrangement of the first and second aspects may be adapted to damp the mechanical resonance peak at least in order to ease handling of an output signal of the appropriate detection means. If the resonance peak is too high the corresponding output signal of the appropriate detection means will also be high. High output signal increases the risk of overloading the electronic detection means.

To avoid overloading, the damping arrangement may be adapted to damp the mechanical resonance peak of the vibration sensor with at least 2 dB, such as at least 4 dB, such as at least 6 dB, such as at least 8 dB, such as at least 10 dB, such as at least 20 dB, such as at least 30 dB, such as at least 40 dB. Typically, a resonance peak of around 40 dB may be damped between 20 and 30 dB in order to reach a resonance peak between 10 and 20 dB. As previously addressed the damping arrangement does not influence the compliance of the vibration sensor in a significant manner.

The moveable mass may essentially be free to move whereas the suspension member may be in a relative fixed position relative to a vibration sensor frame or housing structure. The mass of the suspended moveable mass may be in the range of 0.8-26 mg, such as in the range of 1.6-13 mg, such as around 6.5 mg.

The damping substance may have a viscosity within the range between 1000 and 100000 cP, such as between 2000 and 80000 cP, such as between 3000 and 50000 cP, such as between 4000 and 40000 cP, such as between 5000 and 30000 cP, such as between 6000 and 20000 cP, such as around 10000 cP. A suitable candidate as a damping substance may comprise oil forming an oil layer in that oil is stable over time and it does not tend to evaporate. Moreover, oil comes with a wide range of viscosities. Other suitable candidates as damping substances may involve viscoelastic materials or gels, magnetic fluids etc.

The thickness of such a damping substance may be smaller than 1 mm, such as smaller than 800 µm, such as smaller than 600 µm, such as smaller than 500 µm such as smaller than 400 µm, such as smaller than 300 µm, such as smaller than 200 µm, such as smaller than 100 µm, such as smaller than 50 µm. Typically the thickness of the damping substance will be between 20 µm and 500 µm. The total amount of damping substance being applied may be below 1 mm$^3$, such as below 0.5 mm$^3$, such as below 0.1 mm$^3$.

The damping substance may be a deformable/mouldable material. As addressed above the damping substance may comprise an oil forming an oil layer, and wherein the oil layer is kept in position by capillary forces only. Alternatively or in combination therewith the damping substance may comprise a viscoelastic material, such as a gel, and wherein the viscoelastic material is kept in position by capillary forces only.

The mechanical resonance frequency of the vibration sensor may in principle be arbitrary. However, the mechanical resonance frequency may typically be between 1 kHz and 10 kHz, such as between 2 kHz and 8 kHz, such as between 3 kHz and 5 kHz.

The suspension member may comprise one or more resilient members. To ensure proper damping of the resonance peak the suspension member should be essentially static relative to the moveable mass. To comply with this the resilient member may be secured to an essential static frame structure of the vibration sensor.

The resilient member may comprise a plurality of operationally connected spring elements, such as four spring elements being arranged in an X-shaped arrangement having a centre portion. The centre portion may be hard connected to the suspended moveable mass, whereas four discrete portions of damping substance may be provided between the moveable mass and each of the respective four spring elements.

The vibration sensor may further comprise an electronic read-out arrangement for generating an output single in response to detected vibrations. The electronic read-out arrangement may comprise an electrically charged layer in the form of an electret layer secured to the moveable mass. The electret layer and the moveable mass form a backplate in combination. The electronic read-out arrangement may further comprise a bottom electrode. The bottom electrode may also serve as a bottom limiter for limiting the movements of the moveable mass in one direction. Additionally, a top limiter may be provided for limiting the movements of the moveable mass in the opposite direction.

The vibration sensor may be implemented as a Micro Electro-Mechanical System (MEMS). In a MEMS implementation of the vibration sensor the electret layer may be replaced by a layer which is charged by a voltage source.

In a third aspect the present invention relates to portable device comprising a vibration sensor according to the first and/or second aspect.

In a fourth aspect the present invention relates to a vibration or acceleration sensor comprising
1) a suspended moveable mass being suspended in a suspension member and being adapted to move in response to vibrations or accelerations, and
2) a damping arrangement comprising a damping substance, wherein the suspended moveable mass is arranged to interact directly or indirectly with the damping substance in order to reduce a mechanical resonance peak of the vibration sensor.

Thus, the present invention relates to a sensor for detecting vibrations or acceleration. However, in the following reference will only be made to the detection of vibrations although the general principles underlying the present invention apply equally to the detection of accelerations.

The vibrations may be detected by bringing a moveable mass into movements/vibrations and detecting said movements/vibrations by appropriate detection means, such as appropriate electronic detection means.

The damping arrangement of the present invention is advantageous in that it does not influence the compliance of the vibration sensor in a significant manner. This advantage may be provided by ensuring that the applied damping substance is not limited in volume. Thus, the fact that the damping substance is not limited in volume facilitates that a squeeze film damping mechanism may take place without significantly influencing the compliance of the sensor. In the present context a change of the resonance frequency between 10 Hz and 150 Hz in case of a nominal resonance frequency between 2 kHz and 6 kHz will be acceptable. It should be noted however that the change of the resonance frequency may depend on the viscosity of the damping substance used.

The suspended moveable mass may be arranged to interact directly or indirectly with the damping substance in order to reduce a mechanical resonance peak of the vibration sensor. In the present disclosure direct interaction should be taken to mean that the suspended moveable mass is in direct contact with the damping substance. Indirect interaction should consequently be taken to mean that the suspended moveable mass is not in direct contact with the damping substance.

The damping arrangement is adapted to damp the mechanical resonance peak at least in order to ease handling of an output signal of the appropriate detection means. If the resonance peak is too high the corresponding output signal of the appropriate detection means will also be high. High output signal increases the risk of overloading the electronic detection means. To avoid overloading, the damping arrangement may be adapted to damp the mechanical resonance peak of the vibration sensor with at least 2 dB, such as at least 4 dB, such as at least 6 dB, such as at least 8 dB, such as at least 10 dB, such as at least 20 dB, such as at least 30 dB, such as at least 40 dB. Typically, a resonance peak of around 40 dB may be damped between 20 and 30 dB in order to reach a resonance peak between 10 and 20 dB. As previously addressed the damping arrangement does not influence the compliance of the vibration sensor in a significant manner.

The moveable mass may essentially be free to move whereas the suspension member may be in a relative fixed position relative to a vibration sensor frame or housing structure. The mass of the suspended moveable mass may be in the range of 0.8-26 mg, such as in the range of 1.6-13 mg, such as around 6.5 mg.

The damping substance may be at least partly arranged between the suspended moveable mass and the suspension member. In particular, the damping substance may be arranged between an essentially plane surface of the suspended moveable mass and an essentially plane surface of the suspension member. Alternatively or in combination therewith, the damping substance may at least partly be arranged between a substantially fixed sensor element and the suspension member. The substantially fixed sensor element may involve a top limiter or any other substantially static frame structure of the sensor. Alternatively or in combination therewith, the damping substance may at least partly be arranged between a substantially fixed sensor element and the suspended moveable mass.

The damping substance may form a single coherent volume, or it may be divided into a plurality of discrete volumes being position at predetermined positions between the suspended moveable mass and for example the suspension member in order to obtain a predetermined damping of the resonance peak. Thus, it may be advantageous to divide the damping substance into a plurality of discrete volumes and place these discrete volumes at selected spots to get a predetermined damping.

The damping substance may have a viscosity within the range between 1000 and 100000 cP, such as between 2000 and 80000 cP, such as between 3000 and 50000 cP, such as between 4000 and 40000 cP, such as between 5000 and 30000 cP, such as between 6000 and 20000 cP, such as around 10000 cP. A suitable candidate as a damping substance may comprise oil forming an oil layer in that oil is stable over time and it does not tend to evaporate. Moreover, oil comes with a wide range of viscosities. Other suitable candidates as damping substances may involve viscoelastic materials or gels, magnetic fluids etc.

The thickness of such a damping substance may be smaller than 1 mm, such as smaller than 800 μm, such as smaller than 600 μm, such as smaller than 500 μm such as smaller than 400 μm, such as smaller than 300 μm, such as smaller than 200 μm, such as smaller than 100 μm, such as smaller than 50 μm. Typically the thickness of the damping substance will be between 20 μm and 500 μm. The total amount of damping substance being applied may be below 1 $mm^3$, such as below 0.5 $mm^3$, such as below 0.1 $mm^3$.

A viscoelastic material or gel maintains its position as it cures to a substantially fixed shape while still being viscous. An oil layer may at least partly be kept in position by capillary forces. In fact the oil layer may be kept in position by capillary forces only. This is advantageous in that the outer boundaries of the damping substance then become flexible whereby the addition of stiffness to the overall system may be essentially avoided. The flexible outer boundaries of the damping substance imply that the damping substance is not limited in volume. As already addressed this facilitates a squeeze film damping mechanism of the moveable mass without significantly influencing the compliance of the sensor.

The mechanical resonance frequency of the vibration sensor may in principle be arbitrary. However, the mechanical resonance frequency may typically be between 1 kHz and 10 kHz, such as between 2 kHz and 8 kHz, such as between 3 kHz and 5 kHz.

The suspension member may comprise one or more resilient members. To ensure proper damping of the resonance peak the suspension member should be essentially static relative to the moveable mass. To comply with this the resilient member may be secured to an essential static frame structure of the vibration sensor.

The resilient member may comprise a plurality of operationally connected spring elements, such as four spring elements being arranged in an X-shaped arrangement having a centre portion. The centre portion may be hard connected to the suspended moveable mass, whereas four discrete volumes of damping substance may be provided between the moveable mass and each of the respective four spring elements.

The vibration sensor may further comprise an electronic read-out arrangement for generating an output single in response to detected vibrations. The electronic read-out arrangement may comprise an electrically charged layer in the form of an electret layer secured to the moveable mass. The electret layer and the moveable mass form a backplate in combination. The electronic read-out arrangement may further comprise a bottom electrode. The bottom electrode may also serve as a bottom limiter for limiting the movements of the moveable mass in one direction. Additionally, a top limiter may be provided for limiting the movements of the moveable mass in the opposite direction.

The vibration sensor may be implemented as a Micro Electro-Mechanical System (MEMS). In a MEMS implementation of the vibration sensor the electret layer may be replaced by a layer which is charged by a voltage source.

In a fifth aspect the present invention relates to a damping arrangement comprising a damping substance, wherein the damping substance is adapted to interact directly or indirectly with a suspended moveable mass of a vibration sensor in order to reduce a mechanical resonance peak of a vibration sensor.

The damping substance may be implemented as disclosed in connection with the first aspect of the present invention.

In a sixth aspect the present invention relates to a method for reducing a mechanical resonance peak of a vibration or acceleration sensor, the method comprising the step of providing a damping substance being adapted to interact directly or indirectly with a suspended moveable mass.

Again, the damping substance may be implemented as disclosed in connection with the first aspect of the present invention.

BRIEF DESCRIPTION OF THE DRAWINGS

The present invention will now be described in further details with reference to the accompanying figures, wherein FIG. 8 shows an example of separate spring elements and damping elements.

Figure 1A:
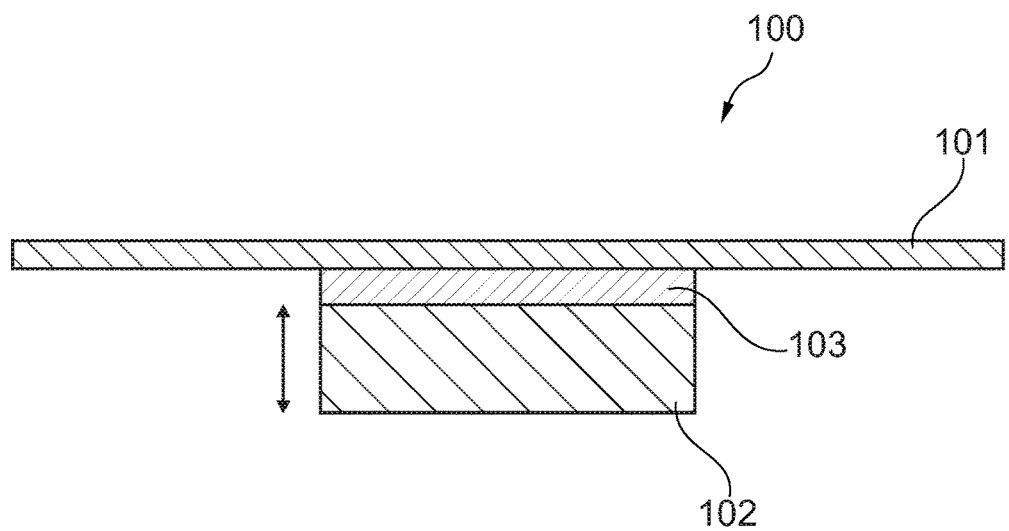
FIG. 1a and FIG. 1b show the squeeze film damping principle of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a vibration or acceleration sensor having a damped resonance peak. In particular, the present invention relates to a vibration or acceleration sensor comprising an arrangement for damping the resonance frequency of the vibration or acceleration sensor without significantly influencing the compliance of the vibration sensor, i.e. without significantly influencing the sensitivity as well as the position of the resonance peak of the vibration or acceleration sensor.

Referring now to FIG. 1a the squeeze film damping principle 100 of the present invention is illustrated. FIG. 1 shows a moveable mass 102 which is adapted to move up and down in response to vibrations of the vibration sensor. The up and down movements of the moveable mass 102 are illustrated by the arrow. In order to damp the resonance peak of the vibration sensor a damping substance 103 is arranged between the moveable mass 102 and an, in relation thereto, a suspension member 101 which may be secured to a frame structure and/or housing of the vibration sensor, cf. FIGS. 2-5.

The damping properties of the damping substance are given by the length, width and height of the volume of the damping substance as well as the properties of the damping substance itself. The damping substance may involve a fluid, such as oil or a viscoelastic material or gel, having a viscosity around 10000 cP. Other viscosities may be applicable as well.

Preferably, the damping substance is kept in position between the moveable mass 102 and the suspension member 101 by capillary forces only. In this way the outer boundaries of the damping substance are flexible whereby the addition of stiffness to the overall system can essentially be avoided. The flexible boundaries facilitate that the damping substance is not limited in volume.

The resonance peak of the vibration sensor typically falls within the range between 1 kHz and 10 kHz. However, other frequency ranges may also be applicable. Compared to an undamped resonance peak the damping substance is adapted to damp the resonance peak typically between around 20 and 30 dB.

The suspension member 101 can be implemented in various ways. In one embodiment the suspension member is implemented as four resilient members being connected in an X-shaped arrangement, cf. FIGS. 3, 4 and 6.

Figure 1B:
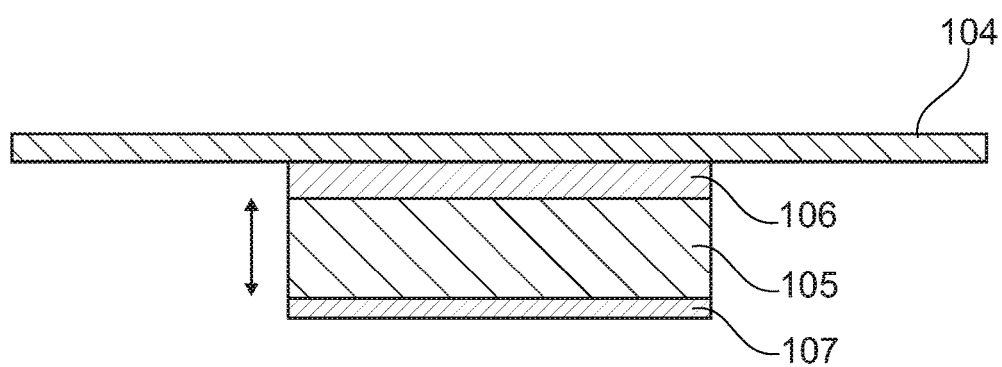

Referring now to FIG. 1b an electret layer 107 in the form of a polytetrafluoroethylene layer, such as Teflon, has been applied to the moveable mass 105. Again, a damping substance 106 is positioned between the moveable mass 105 and a suspension member 104. The electret layer 107 is intended for electret read-out of the movements of the moveable mass 105.

Figure 2:
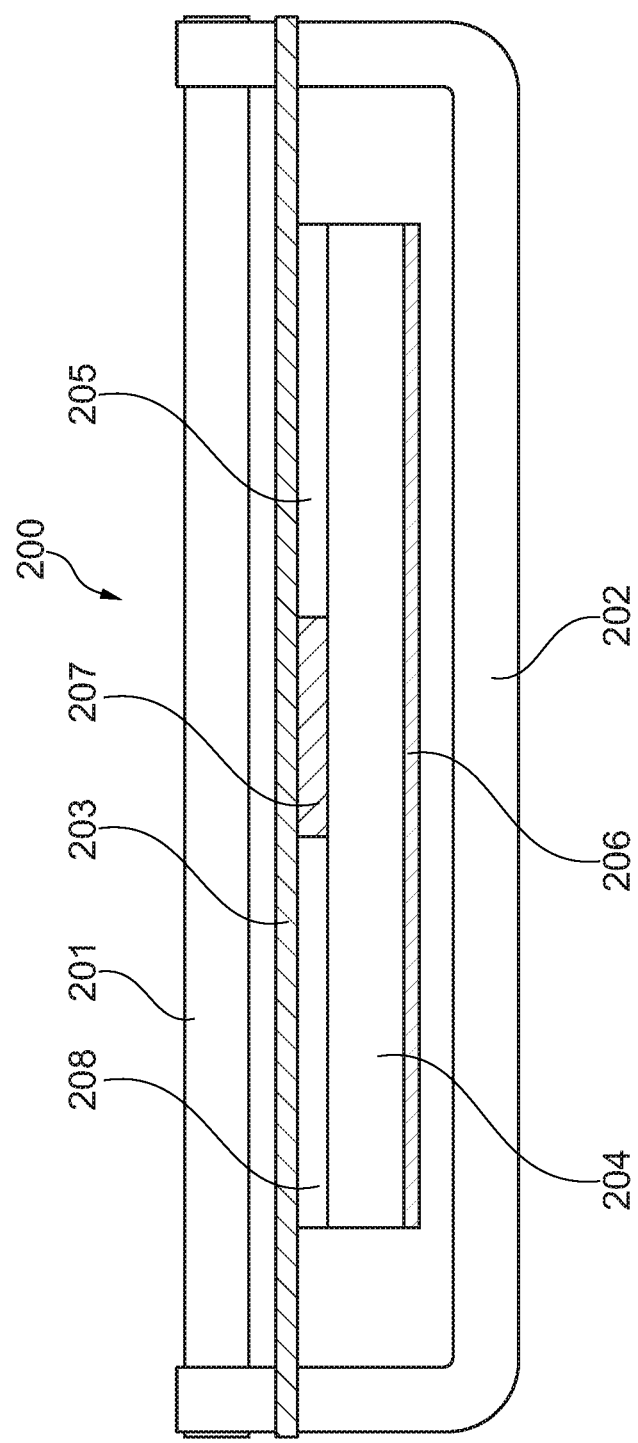
FIG. 2 shows a cross-sectional view of an embodiment of the present invention.

Referring now to FIG. 2 a cross-sectional view of an embodiment of a vibration sensor assembly 200 is depicted. Similar to FIG. 1a and FIG. 1b the moveable mass 204 interact with the suspension member 203 via the damping substance 205 and the hard connection element 207. Thus, the moveable mass 204 is hard connected to the suspension member 203 via hard connection element 207. As disclosed in relation to FIG. 1a the suspension member 203 may be implemented as a resilient member. Also, an electret read-out arrangement comprising an electret layer 206 of for example polytetrafluoroethylene has been applied to the moveable mass 204. The electret layer 206 of polytetrafluoroethylene acts as a backplate in combination with the moveable mass 204.

The vibration sensor assembly 200 of FIG. 2 further comprises a top limiter 201 and a bottom electrode 202 to which the suspension member 203 is secured. The bottom electrode 202 also acts as a bottom limiter. The top and bottom limiters 201, 202 set the outer limits of the movements of the moveable mass. Similar to FIG. 1 the damping substance is kept in position between the suspension member 203 and the moveable mass 204 by capillary forces only.

In the cross-sectional view of FIG. 2 the damping substance 205 is depicted as being two volumes, but as it will appear from the following figures the total number of discrete volumes is in fact four. However, the damping substance 205 to be positioned between the moveable mass 204 and the suspension member 203 may be divided into a number of smaller volumes where each of said smaller volumes is kept in position by respective capillary forces only. The total amount of damping substance being applied is typically below 1 mm$^3$, such as below 0.5 mm$^3$, such as below 0.1 mm$^3$. The thickness of the damping substance is typically smaller than 1 mm, such as smaller than 800 μm, such as smaller than 600 μm, such as smaller than 500 μm such as smaller than 400 μm, such as smaller than 300 μm, such as smaller than 200 μm, such as smaller than 100 μm, such as smaller than 50 μm. Typically the thickness of the damping substance will be between 20 μm and 500 μm.

The overall dimensions of the vibration sensor are typically a few millimeters in each direction (height, width and length). In fact, the elements shown in FIG. 2 may be manufactured using MEMS technology with the exception that the electret layer 206 is replaced by a conducting layer being charged by a voltage source as previously mentioned.

Figure 3:
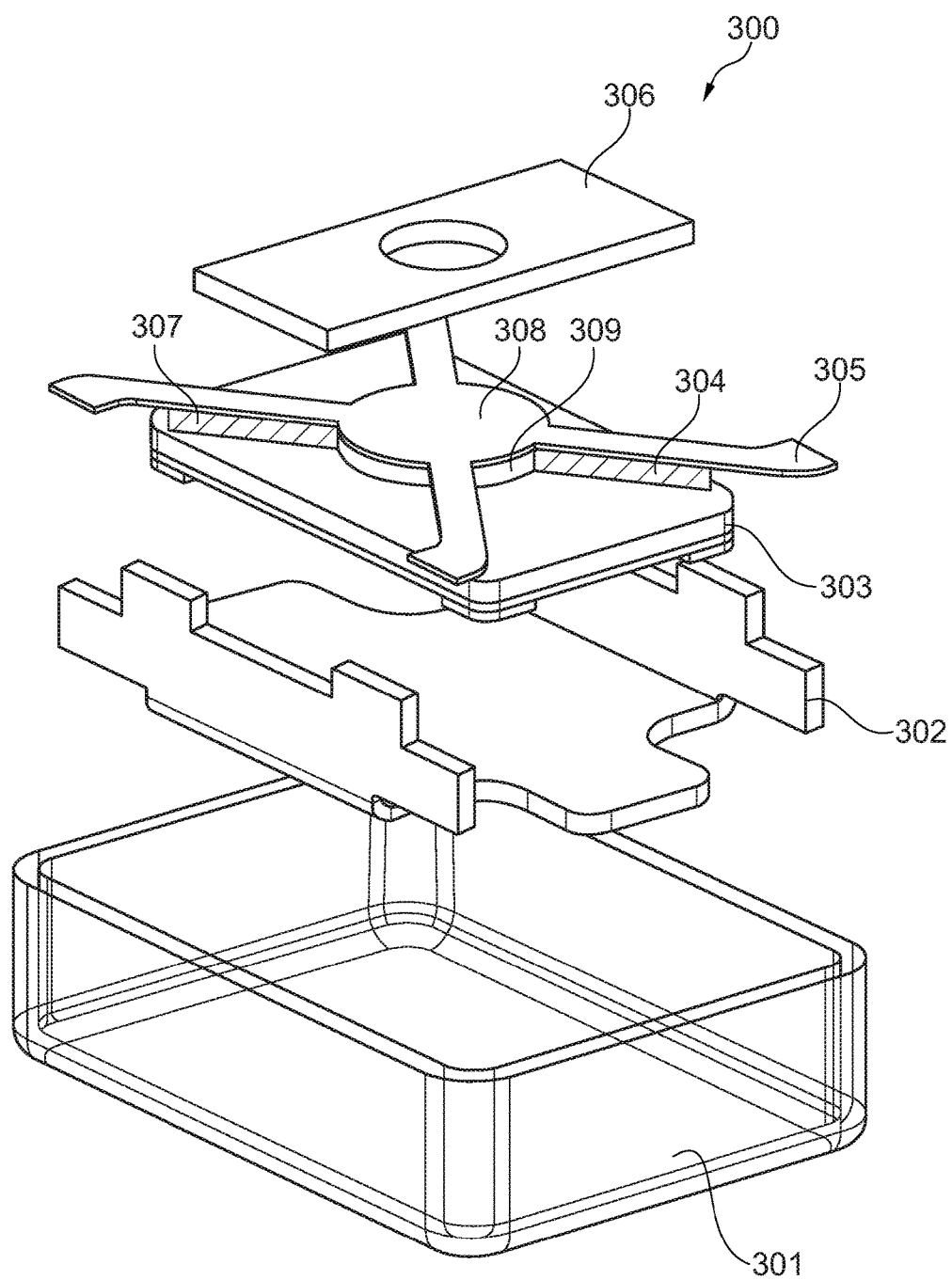
FIG. 3 shows an exploded view of an embodiment of the present invention.
Figure 4:
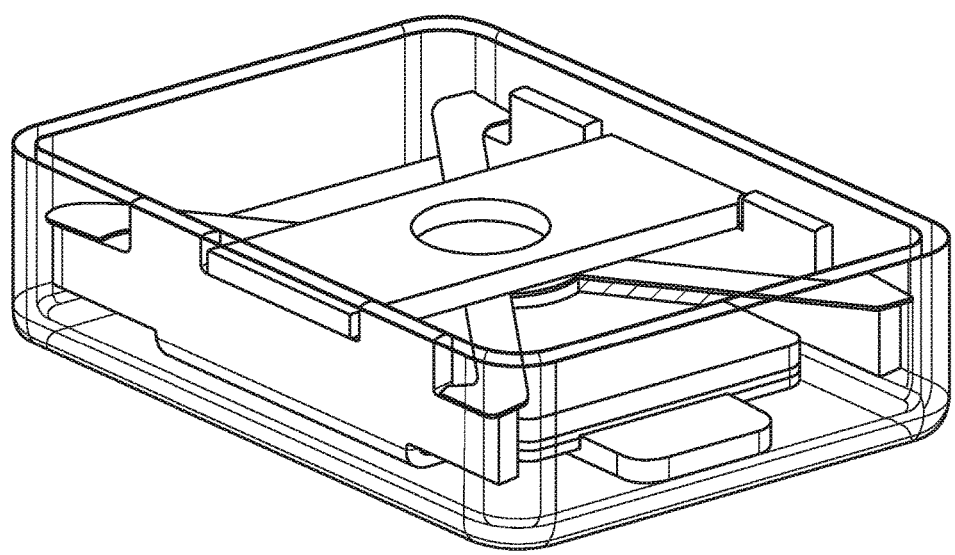
FIG. 4 shows an assembled embodiment of the present invention.

FIG. 3 shows an exploded view 300 of a vibration sensor of an embodiment of the present invention. As seen in FIG. 3 a housing 301, a bottom electrode/limiter 302, a moveable mass 303, a suspension member 305, 308 and a top limiter 306 is provided. The suspension member 305, 308 takes the form of four resilient legs 305 being connected in an X having a disc-shaped centre portion 308. The disc-shaped centre portion 308 is hard connected via connection 309 to the moveable mass 303. To ensure proper damping of the moveable mass 303 the damping substance 304, 307 is positioned between the four resilient legs 305 of the X-shaped damping member and the moveable mass 303 In case the damping substance 304, 307 is oil it is kept in position by capillary forces only. In case the damping substance 304, 307 is a cured viscoelastic material or gel capillary forces do obviously not play a role. FIG. 4 shows an assembled vibration or acceleration sensor.

Figure 5:
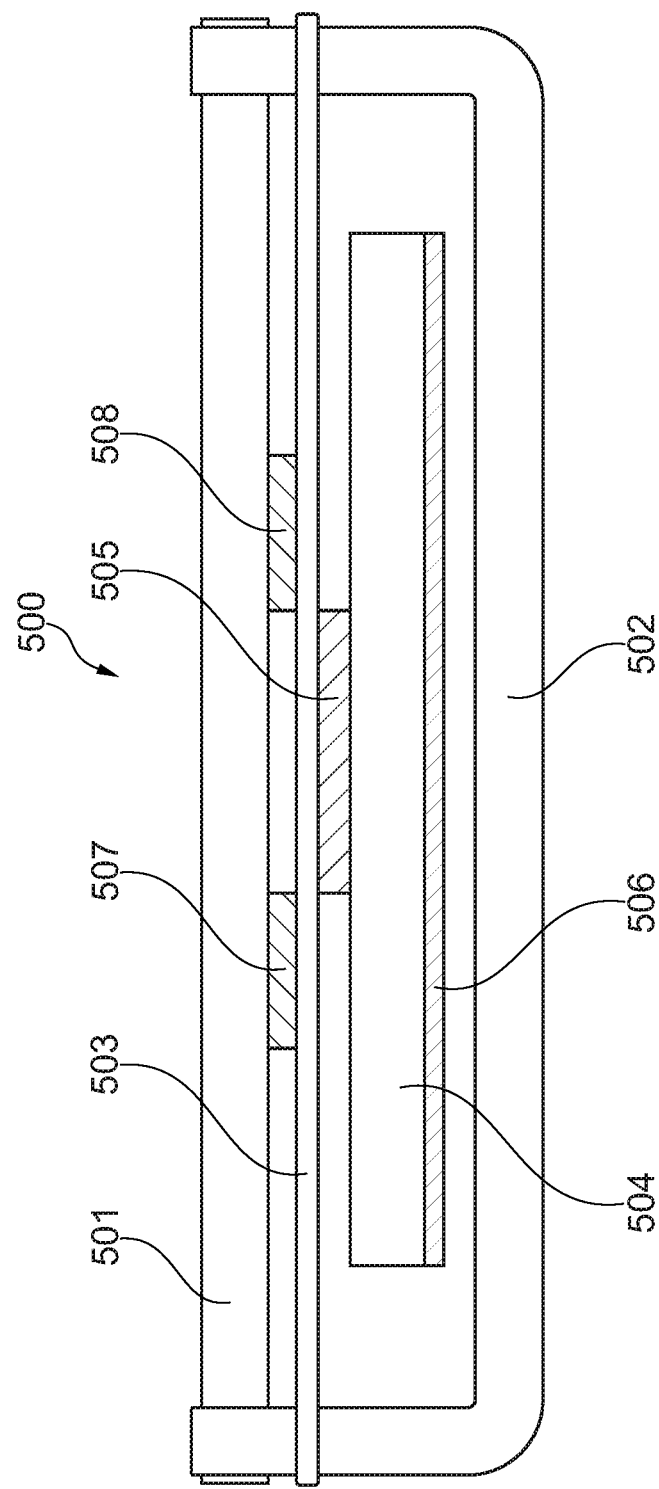
FIG. 5 shows a cross-sectional view of another embodiment of the present invention.

FIG. 5 shows a cross-sectional view of another embodiment of a vibration sensor assembly 500. Similar to FIG. 2 the moveable mass 504 is hard connected to the suspension member 503 via the connection element 505. Again, the suspension member 503 may be implemented as on or more resilient members. An electret read-out arrangement comprising an electret layer 506 of for example polytetrafluoroethylene has been applied to the moveable mass 504.

Similar to FIG. 2 the embodiment shown in FIG. 5 comprises a top limiter 501 and a bottom electrode/limiter 502 to which the suspension member 503 is secured.

The embodiment shown in FIG. 5 further comprises discrete volumes of damping substance 507, 508 between the top limiter 501 and the suspension member 503. The damping substances of the discrete smaller volumes 507, 508 are kept in position by capillary forces only.

Figure 6:
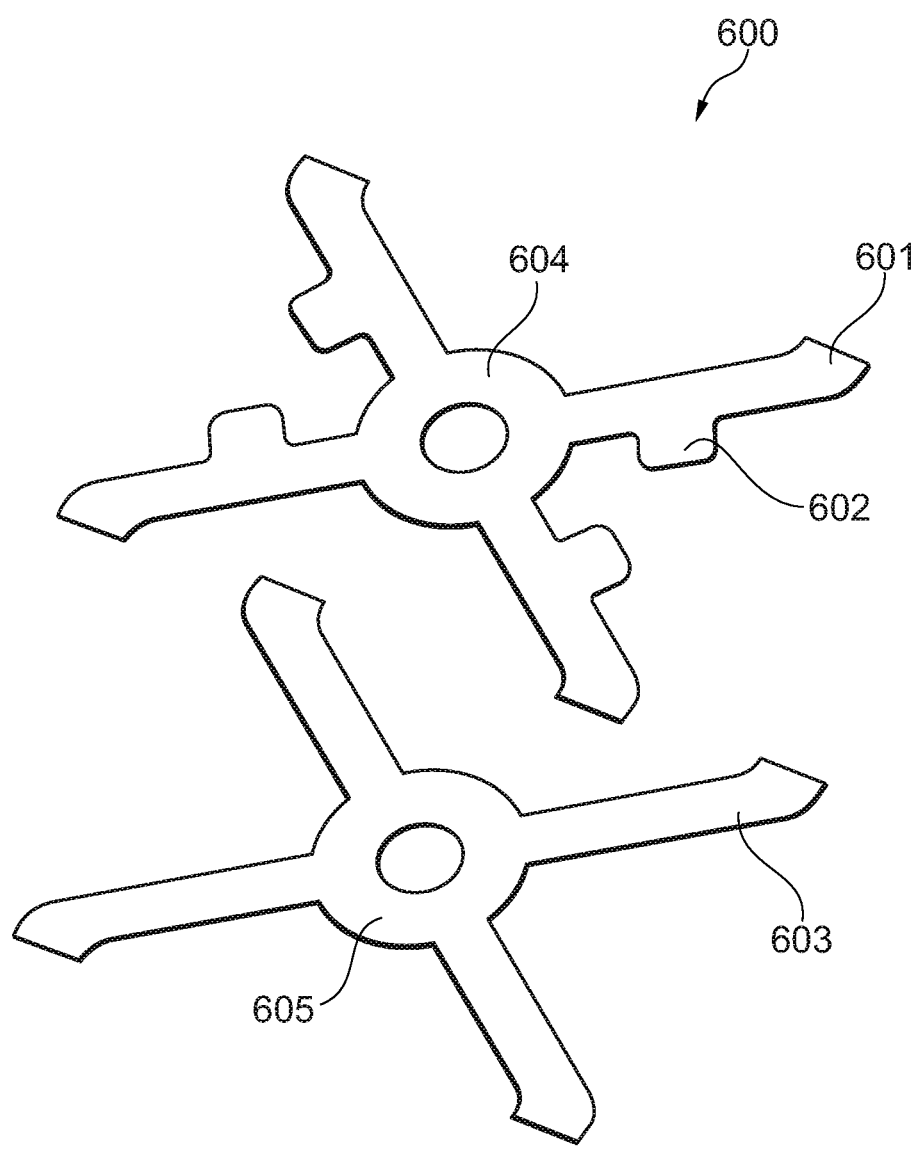
FIG. 6 shows examples of combined spring elements and damping elements.

The inventors have found that the suspension member may advantageously be formed so that the damping substance may be positioned at predetermined spots between the suspension member and the moveable mass. FIG. 6 shows examples of two X-shaped suspension members 600. As seen in FIG. 6 both the upper and lower suspension members comprise four resilient legs 601, 603 arranged in an X having respective centre portions 604, 605. The centre portions 604, 605 are adapted to be hard connected to a moveable mass. Each of the resilient legs 601 of the upper suspension member comprises an integrated surface portion 602. This integrated surface portion 602 allows that an increased amount of damping substance may be provided at the positions of the four integrated surface portions 602. Thus, in the examples shown in FIG. 6 the damping substance acts directly on each of the resilient legs 601, 603. Other types of arrangements of integrated surface portions may obviously be applicable as well.

Figure 7:
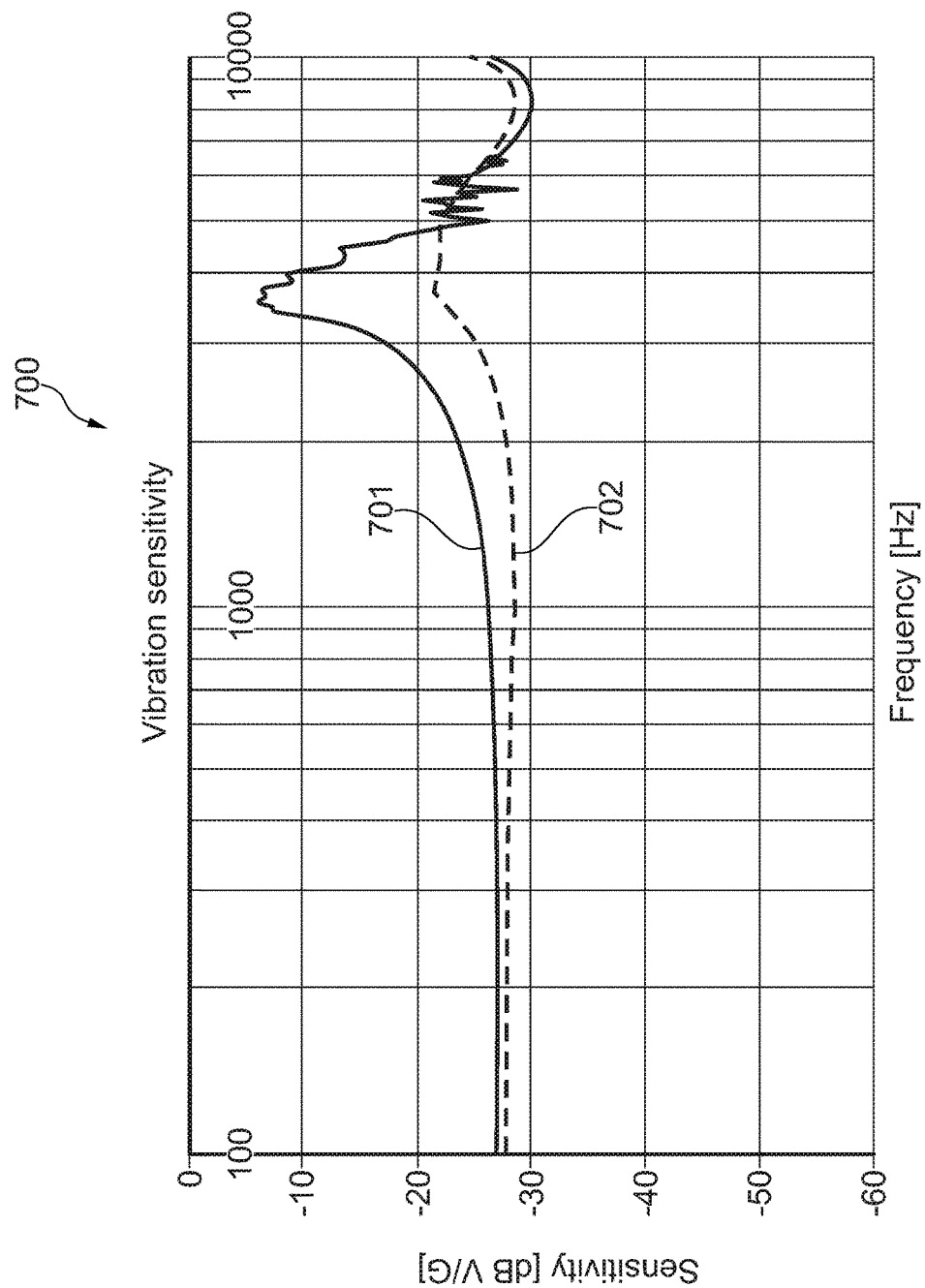
FIG. 7 shows a frequency response of a damped and an undamped vibration sensor.

FIG. 7 shows the frequency of two vibration sensors— one vibration sensor without damping 701 and one vibration sensor with damping 702. The damping has been achieved using a resilient suspension member (X-shaped) and oil as the damping substance. As seen in FIG. 7 the resonance peak has been damped around 16 dB without being shifted in any direction, i.e. the resonance frequency stays at around 3.5 kHz.

Figure 9:
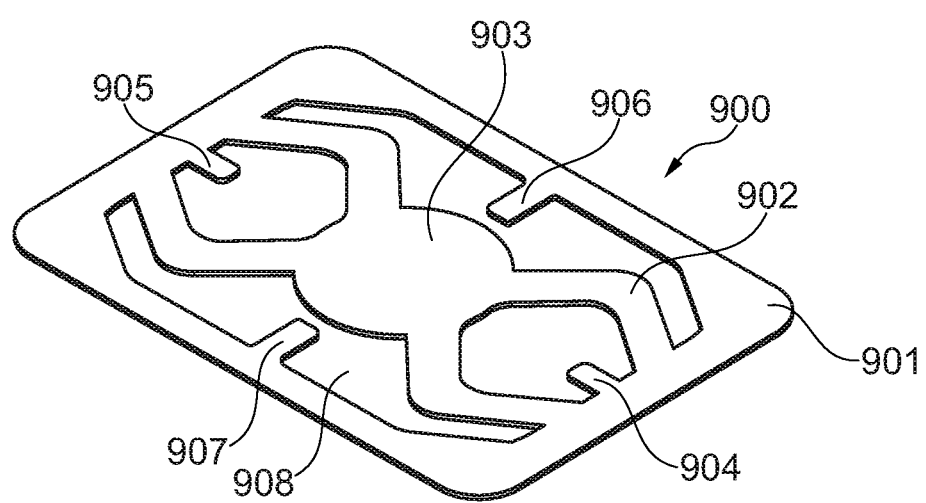
FIG. 9 shows another example of separate spring elements and damping elements.

FIGS. 8 and 9 depict suspension members where the applied damping substance is not in direct contact with resilient legs suspending the moveable mass by hard connecting said moveable mass to the centre portion of the suspension member.

Referring now to FIG. 8a a suspension member 800 having a frame structure 801, four resilient legs 805 and a centre portion 802 is depicted. The suspension member 800 is preferably a one-piece and thereby an integrated structure being manufactured in a suitable material. The frame structure 801 is adapted to be secured to a housing portion or other fixed portion of the vibration sensor while the centre portion 802 is adapted to be hard connected to a moveable mass (not shown). The suspension member 800 comprises two distinct surface portions 803, 804 which are physically separated from the resilient legs 805. Between or around the various elements of the suspension member 800 a through-going opening 808 is provided. The damping substance 806, 807 is intended to be positioned between the surface portions 803, 804 and a suspended moveable mass (not shown). Thus, the suspension member shown in FIG. 8 may be used in connection with two discrete damping regions. In case of a fluidic damping substance the substance is kept in position by capillary forces. The damping substance can also involve a cured viscoelastic material or gel.

Turning now to FIG. 8b a similar suspension member is depicted. As seen, the suspension member comprises a frame structure 809, four resilient legs 811, a centre portion 810, two distinct surface portions 812, 813 and a through-going opening 820. The suspension member is preferably a one-piece and thereby an integrated structure being manufactured in a suitable material. Again, the frame structure 809 is adapted to be secured to a housing portion or other fixed portion of the vibration sensor while the centre portion 810 is adapted to be hard connected to a moveable mass (not shown). In FIG. 8b the damping substance 816-819 is intended to be positioned between the distinct surface portions 812, 813, and the frame portions 814, 815 and a suspended moveable mass (not shown). Thus, a total of four discrete damping regions are provided. From a performance perspective four damping regions may be preferred over two damping regions in that wobbling effects of the suspended moveable mass may then be almost avoided. In case of a fluidic damping substance the substance is kept in position by capillary forces. The damping substance can also involve a cured viscoelastic material or gel.

FIG. 9 shows another implementation of a suspension member 900. Similar to the suspension member shown in FIGS. 8a and 8b the resilient legs 902 are separated from four distinct surface portions 904-907 under which the damping substance is adapted to be positioned. The suspension member is preferably a one-piece and thereby an integrated structure being manufactured in a suitable material. Between the various elements of the suspension member a through-going opening 908 is provided. The damping substance (not shown) is intended to be positioned between the distinct surface portions 904-907 and a suspended moveable mass (not shown) which is hard connected to the centre portion 903. The frame structure 901 is adapted to be secured to a housing portion or other fixed portion of the vibration sensor. Suitable damping substances can be fluidic substances, such as oils, and/or cured viscoelastic materials or gels. In case of fluidic damping substances the substance is kept in position by capillary forces.

The invention claimed is:

1. A vibration sensor comprising
   1) a moveable mass being suspended in a suspension member and being adapted to move in response to vibrations or accelerations, wherein the moveable mass and the suspension member are rigidly connected across one or more gaps formed by respective opposing surfaces of the moveable mass and the suspension member, and
   2) a damping arrangement comprising a damping substance, wherein the moveable mass is arranged to interact directly or indirectly with the damping substance in order to reduce a mechanical resonance peak of the vibration sensor.

2. A vibration sensor according to claim 1, wherein the damping substance fills out at least part of the one or more gaps between the moveable mass and the suspension member.

3. A vibration sensor according to claim 1, wherein the damping substance fills out at least part of one or more gaps formed by respective opposing surfaces of an essential static structure and the suspension member.

4. A vibration sensor according to claim 1, wherein the damping substance is divided into a plurality of discrete damping substance portions in the form of dots of damping substance, essentially linear damping substance portions or curved damping substance portions.

5. A vibration sensor according to claim 1, wherein the damping substance forms an enveloping structure in the form of a rim-shaped structure in the form of an essential circular structure, an essential elliptical structure, an essential rectangular structure or an essential quadratic structure.

6. A vibration sensor according to claim 1, wherein the damping substance is positioned symmetrically around a static displacement node or a static displacement axis of the moveable mass.

7. A vibration sensor according to claim 1, wherein the damping arrangement is adapted to damp the mechanical resonance peak of the vibration sensor with at least 2 dB.

8. A vibration sensor according to claim 7, wherein the damping substance has a viscosity within the range between 1000 and 100000 cP.

9. A vibration sensor according to claim 7, wherein the damping substance has a thickness being smaller than 1 mm.

10. A vibration sensor according to claim 7, wherein the damping substance is deformable/mouldable.

11. A vibration sensor according to claim 7, wherein the damping substance comprises an oil forming an oil layer, and wherein the oil layer is kept in position by capillary forces only.

12. A vibration sensor according to claim 7, wherein the damping substance comprises a viscoelastic material, and wherein the viscoelastic material is kept in position by capillary forces only.

13. A vibration sensor according to claim 7, wherein the mechanical resonance frequency of the vibration sensor is between 1 kHz and 10 kHz.

14. A vibration sensor according to claim 7, wherein the suspension member comprises one or more resilient members secured to an essential static structure of the vibration sensor, and wherein the vibration sensor is a miniature vibration sensor.

15. A vibration sensor according to claim 14, wherein the one or more resilient members comprise a plurality of operationally connected spring elements.

16. A vibration sensor according to claim 15, wherein the plurality of operationally connected spring elements comprise four spring elements arranged in an X-shaped arrangement.

17. A vibration sensor according to claim 7, further comprising an electronic read-out arrangement, said electronic read-out arrangement comprising an electrically charged layer secured to the moveable mass.

18. A portable device comprising a vibration sensor according to claim 1.

19. A vibration sensor comprising
   1) a moveable mass being suspended in a suspension member and being adapted to move in response to vibrations or accelerations, wherein the moveable mass and the suspension member are rigidly connected, and
   2) a damping arrangement comprising
      A. a damping substance being provided as a plurality of discrete damping substance portions, or
      B. a damping substance being provided as an enveloping structure of damping substance,
   wherein the moveable mass is arranged to interact with damping substance in order to reduce a mechanical resonance peak of the vibration sensor.

20. A vibration sensor according to claim 19, wherein the damping substance fills out at least part of one or more gaps formed by respective opposing surfaces of the moveable mass and an essential static structure.

21. A vibration sensor according to claim 19, wherein the damping substance fills out at least part of one or more gaps formed by respective opposing surfaces of the moveable mass and the suspension member.

22. A vibration sensor according to claim 19, wherein the damping substance fills out at least part of one or more gaps formed by respective opposing surfaces of an essential static structure and the suspension member.

23. A vibration sensor according to claim 19, wherein the plurality of discrete damping substance portions form dots of damping substance, essentially linear damping substance portions or curved damping substance portions.

24. A vibration sensor according to claim 19, wherein the enveloping structure of the damping substance forms a rim-shaped structure in the form of an essential circular structure, an essential elliptical structure, an essential rectangular structure or an essential quadratic structure.

25. A vibration sensor according to claim 19, wherein the damping substance is positioned symmetrically around a static displacement node or a static displacement axis of the moveable mass.

* * * * *